US006886805B2

(12) United States Patent
McCarty

(10) Patent No.: US 6,886,805 B2
(45) Date of Patent: May 3, 2005

(54) ROD CONNECTOR ASSEMBLY

(75) Inventor: Michael Wildie McCarty, Marshalltown, IA (US)

(73) Assignee: Fisher Controls International LLC, St. Louis, MO (US)

( * ) Notice: Subject to any disclaimer, the term of this patent is extended or adjusted under 35 U.S.C. 154(b) by 139 days.

(21) Appl. No.: 10/360,668

(22) Filed: Feb. 7, 2003

(65) Prior Publication Data

US 2004/0155216 A1 Aug. 12, 2004

(51) Int. Cl.[7] ............................................... F16K 31/44
(52) U.S. Cl. ................... 251/214; 251/291; 403/408.1; 403/307; 403/373
(58) Field of Search ................................ 251/214, 291, 251/292; 403/408.1, 307, 373

(56) References Cited

U.S. PATENT DOCUMENTS

| 1,288,674 | A | * | 12/1918 | Pratt | 251/214 |
| 3,716,069 | A | * | 2/1973 | Reynolds | 261/214 |
| 4,752,151 | A | * | 6/1988 | Ashida et al. | 403/307 |
| 4,806,809 | A | * | 2/1989 | Kubota et al. | 464/52 |
| 5,052,430 | A | * | 10/1991 | Trautwein | 251/291 |
| 5,082,391 | A | | 1/1992 | Florida | 403/342 |
| 5,193,932 | A | * | 3/1993 | Wu | 403/307 |
| 5,308,184 | A | * | 5/1994 | Bernard | 403/307 |
| 5,323,428 | A | | 6/1994 | Porter et al. | 376/204 |
| 5,799,928 | A | * | 9/1998 | Siver | 251/214 |
| 6,062,539 | A | * | 5/2000 | Kawabe et al. | 251/214 |
| 6,135,670 | A | * | 10/2000 | Bahnman et al. | 403/373 |
| 6,302,374 | B1 | | 10/2001 | Fink | 251/335.3 |

FOREIGN PATENT DOCUMENTS

| DE | 653 090 C | 11/1937 |
| FR | 2 558 904 A | 8/1985 |
| GB | 2 368 620 A | 5/2002 |

OTHER PUBLICATIONS

Samson product brochure, "Ventiel–Bouwsysteem".
International Search Report for PCT/US2004/001513, issued Jun. 15, 2004.
Written Opinion for PCT/US2004/001513, mailed Jun. 15, 2004.

* cited by examiner

*Primary Examiner*—John Bastianelli
(74) *Attorney, Agent, or Firm*—Marshall, Gerstein & Borun LLP

(57) ABSTRACT

An improved rod connector assembly and method for mechanically fastening two rods together. Generally planar mating surfaces of a first rod assembly and a second rod assembly are compressively coupled by a rod union. The compressive load by the rod union is derived from a tapered surface that provides an interference fit to a corresponding tapered surface on the first rod assembly. Clearance diameters provided within the rod union accommodate axial misalignment of the first rod assembly and the second rod assembly. The second rod assembly includes an adjustable rod adapter to provide coupling to rods of various lengths. The first rod assembly includes an internal cavity to receive a portion of the second rod that may protrude from the adjustable rod adapter.

26 Claims, 5 Drawing Sheets

ROD CONNECTOR ASSEMBLY

TECHNICAL FIELD

The rod connector assembly described herein makes known an apparatus and method for mechanically fastening two rods together. More specifically, a valve stem connector and method for fastening an actuator rod to a control valve stem is disclosed. The present rod connector assembly significantly reduces the asymmetric forces exerted by the valve stem on the valve packing due to axial misalignment of the actuator rod and the valve stem.

BACKGROUND

Control valves are typically operated by pneumatic actuators, such as spring and diaphragm actuators, that are directly coupled to the valve. The pneumatic actuator provides the force necessary to move a valve plug to control a fluid flowing through the valve. As understood by those skilled in the art, increasing or decreasing the air pressure within a pressure chamber defined by the diaphragm and the actuator casing, creates an air spring that moves the diaphragm. An actuator rod is attached to the center of the diaphragm and is guided along its longitudinal axis through the actuator housing by a journal bearing. By attaching the actuator rod to the diaphragm, direct changes in actuator air pressure create corresponding changes in the axial position of the actuator rod.

The actuator rod is attached to a valve stem that protrudes from the valve body through the valve bonnet. By mechanically coupling the actuator rod to the valve stem, the position of the attached valve plug can control the fluid flowing through the valve. Typically, the valve stem connector consists of a single, rigid connector that includes two threaded cavities for receiving the actuator rod and the valve stem. Conventional valve stem connectors suffer certain manufacturing disadvantages and design limitations as described below.

FIG. 1 shows a cross-sectional view of typical valve stem connector 10 mechanically fastening the actuator rod 30 to the valve stem 40 of the valve assembly 100. The actuator 48 (partially depicted by the actuator yoke legs) is attached to the valve body 50 by threadably engaging the yoke lock nut 70 to the valve bonnet 64. When the supplied air pressure to the actuator 48 changes, the actuator rod 30 moves correspondingly along a longitudinal axis 90. The valve stem connector 10 couples the axial motion supplied by the actuator rod 30, through the valve stem 40, to the valve plug 46 allowing the valve plug to be positioned relative to the valve seat 60. For example, when the valve plug 46 is positioned away from the valve seat 60, fluids can flow from the valve inlet 52 to the valve outlet 54 as indicated by the arrows shown.

The valve assembly 100 uses valve packing 58 to seal fluids inside the valve body 50 and also provides a guiding surface that is substantially parallel to the valve stem 40. The valve packing 58 is compressively loaded within the valve packing box 61 in the valve bonnet 64 by a packing flange 72, packing studs 69a–b, and packing nuts 66a–b. The compressive load exerted upon the valve packing 58 circumferencially expands the valve packing 58 to create the fluid seal and the guiding surface for the valve stem 40. Accordingly, any asymmetric forces exhibited by the valve stem 40 upon the valve packing 58 can increase packing friction through the region of asymmetric force causing degradation and erosion of the valve packing 58 and substantially reduce its useful life. Conventional valve stem connectors 10 cannot eliminate these asymmetric forces. The presence of these asymmetric forces can increase maintenance costs and can increase the risk of environmental hazards if the fluids escape to the surrounding atmosphere.

Referring to FIGS. 1 and 2, the conventional valve stem connector 10 is comprised of two connector halves 12a–b that are fastened by bolts 14a–b inserted through clearance holes 13a–b and into bolt holes 15a–b to form a rigid connector. The valve stem connector 10 has a threaded upper cavity 20 to "contain" the actuator rod 30 as will be described below. The threaded lower cavity 22 of the valve stem connector 10 "contains" the valve stem 40. The actuator rod 30 and the valve stem 40 are joined when the upper threads 62 and lower threads 68 mechanically engage the corresponding external threads 32 and 38 on the actuator rod 30 and the valve stem 40, respectively. The tapered internal surface 18, resultant of the manufacturing operation and tapered at approximately 45 degrees, connects upper cavity 20 to lower cavity 22. The actuator rod 30 is typically larger in diameter than the valve stem 40 as shown in FIG. 1. Due to conventional design techniques, the valve stem connector 10 can only accommodate small variations in length of the actuator rod 30 and valve stem 40. As appreciated by those familiar with these types of connectors, valve and actuator manufacturers generally resolve this limitation by designing and maintaining a broad product line with numerous combinations of valves and actuators to meet a particular application.

To complete the valve assembly 100, the actuator rod 30 and the valve stem 40 are threaded in counter-rotating directions into cavities 20 and 22 until the desired length is achieved. The travel length of the valve assembly 100 must be set prior to operation and is typically achieved through adjustment in the valve stem connector 10. The adjustability of the valve stem connector 10 is limited in one direction when the end surface 44 of the valve stem 40 makes contact with the end surface 24 of the actuator rod 30. In the opposite direction, the adjustment limitation is based on the a minimum number of threads that must be engaged to create a secure and safe mechanical connection. Conventional valve stem connectors 10 offer an adjustment range of approximately 0.25 to 0.50 inches. Finally, bolts 14a–b are further tightened to create additional compressive load between the threads 32, 38, 62, and 68 to secureably fasten actuator rod 30 to valve stem rod 40.

Since the valve stem 40 and the actuator rod 30 are coupled by threading both into a single rigid connector, narrow manufacturing tolerances on the valve stem connector 10 must be maintained. Any misalignment due to under-toleranced connectors halves 12a–b may further increase the asymmetric forces and therefore the friction experienced by the valve packing 58. The narrow manufacturing tolerances result in higher manufacturing costs and increased assembly difficulty. More significantly, when using a conventional valve stem connector 10, the connection between the actuator rod 30 and the valve stem 40 is rigid. The rigidity of the connection requires the actuator rod 30 and the valve stem 40 to be perfectly aligned along a common longitudinal axis 90 to eliminate valve packing 58 wear. As understood by those skilled in the art, industry standard manufacturing tolerances and typical assembly methods for the actuator 48 and the valve body 50 cannot provide precise alignment of the actuator rod 30 and the valve stem 40.

SUMMARY

Accordingly, it is the object of the present rod connector assembly to provide a connector device that can accommodate axial misalignment between the two rods and conveniently compensate for various lengths of rods. More specifically, the present rod connector significantly reduces the friction created by asymmetric side loads exerted by a valve stem upon valve packing that would otherwise occur in a control valve assembly.

In accordance with one aspect of the present rod connector assembly, a first rod assembly having a tapered clamping surface and a second rod assembly both having generally planar end surfaces are fastened by a rod union that loads the tapered clamping surface to mechanically couple the first and second rod assemblies. An internal cavity within the rod union forms an upper and lower rim to engage mating surfaces on the rod assemblies together. The cavity further forms clearance surfaces that accommodate axial misalignment of the first and second rods.

In accordance with another aspect of the present rod connector assembly, a valve stem assembly and an actuator rod assembly are fastened together. The valve stem assembly includes a valve stem adapter that provides valve travel adjustment. An actuator rod adapter that threadably attaches to the actuator rod contains an internal cavity to accommodate a predetermined length of valve stem that may protrude from the valve stem adapter.

In accordance with another aspect of the present rod connector assembly, the actuator rod is directly modified with an undercut that provides the mating surfaces to the stem union that mechanically couples the valve stem adapter to the actuator rod.

In a further embodiment, a method for reducing the friction between a valve stem assembly and valve packing is established.

In yet another embodiment, a control valve assembly comprises a control valve, an actuation means, and the present rod connector assembly. The actuation means is directly affixed to the control valve. Further, the actuation means includes an actuator rod assembly fastened to a valve stem assembly by a stem union that compressively loads corresponding tapered surfaces that mechanically couple the actuator rod assembly and the valve stem assembly. The stem union provides clearance surfaces that accommodate axial misalignment of the actuator rod assembly and the valve stem assembly. Additionally, the actuator rod adapter contains an internal cavity to accommodate a predetermined length of valve stem that may protrude from the valve stem adapter to facilitate valve travel adjustment.

BRIEF DESCRIPTION OF THE DRAWINGS

The features of this invention which are believed to be novel are set forth with particularity in the appended claims. The invention may be best understood by reference to the following description taken in conjunction with the accompanying drawings in which like reference numerals identify like elements in the several figures and in which:

DETAILED DESCRIPTION

To fully appreciate the advantages of the present rod connector assembly, its functions and features are described in connection with an actuator rod and valve stem. However, one skilled in the art would appreciate the present rod connector assembly could be used in other rod connector applications.

Figure 1:
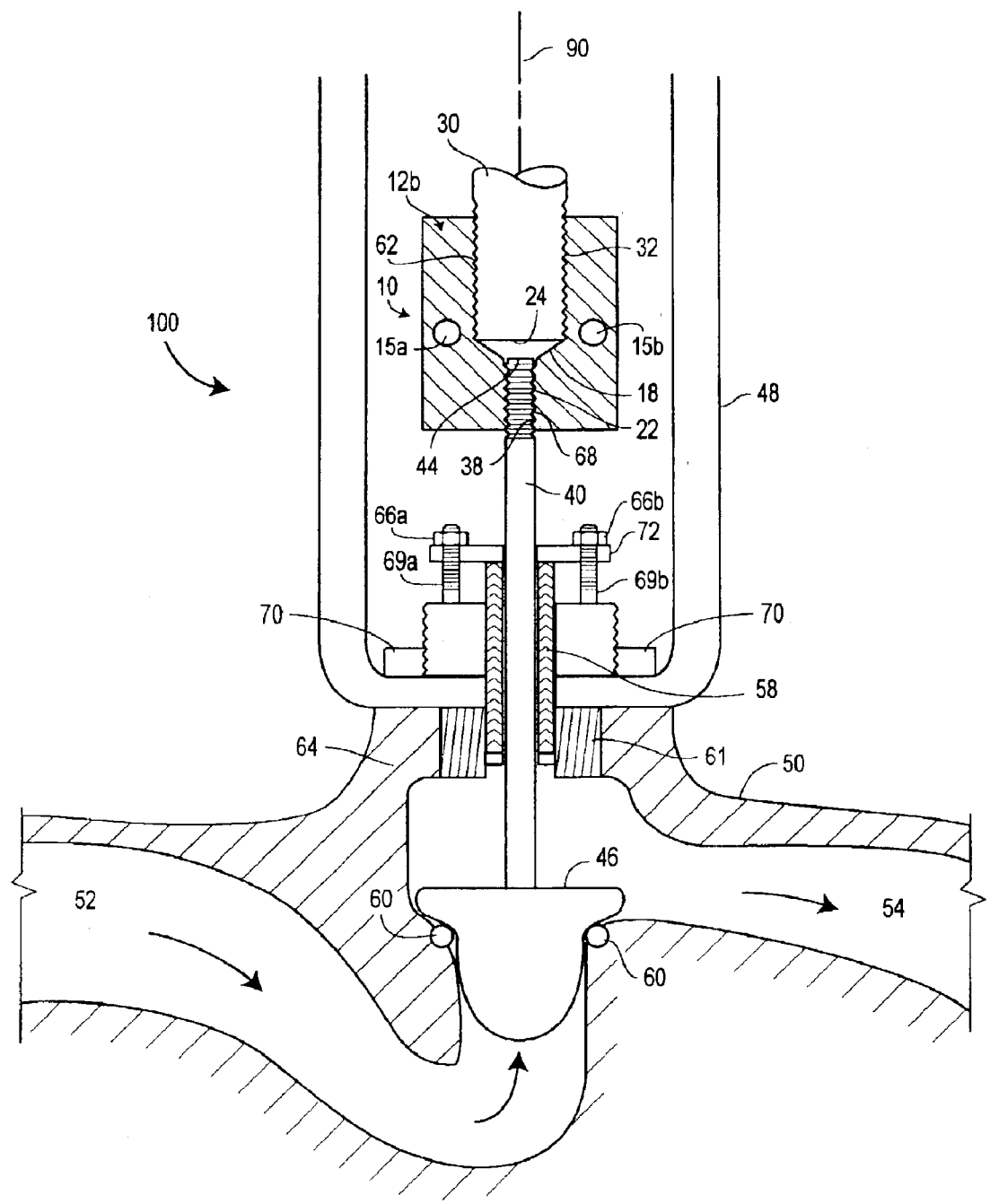
FIG. 1 is a cross-sectional view of a prior art valve stem connector incorporated into a control valve assembly.
Figure 2:
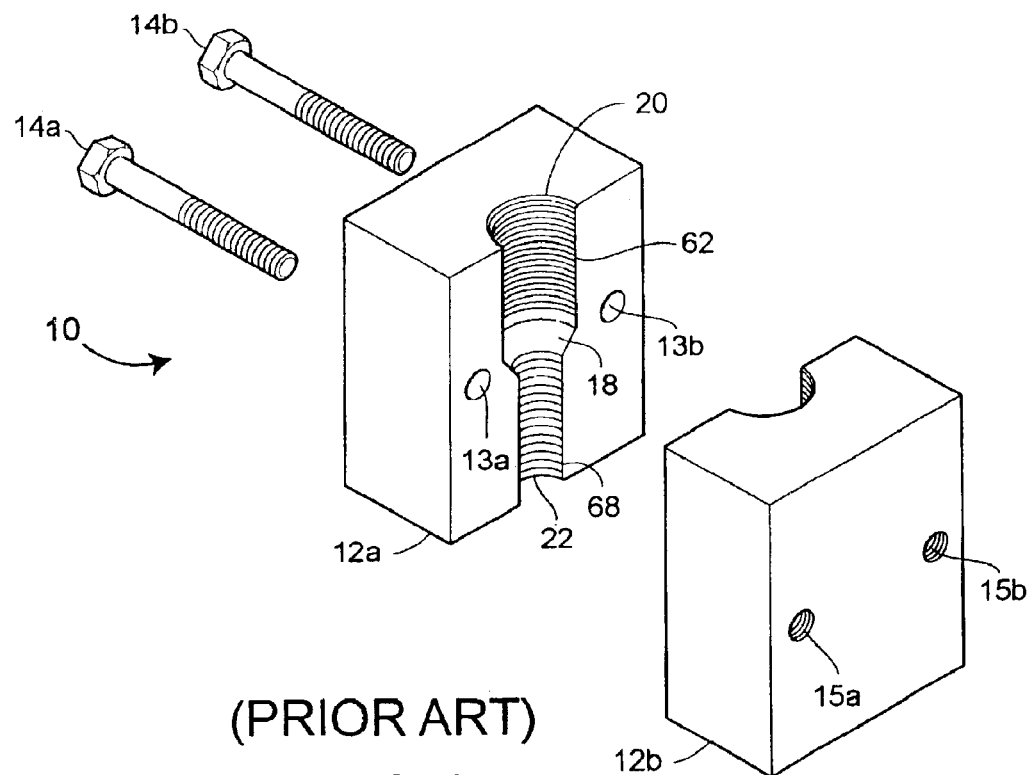
FIG. 2 is a perspective view of the prior art valve stem connector shown in FIG. 1.
Figure 3:
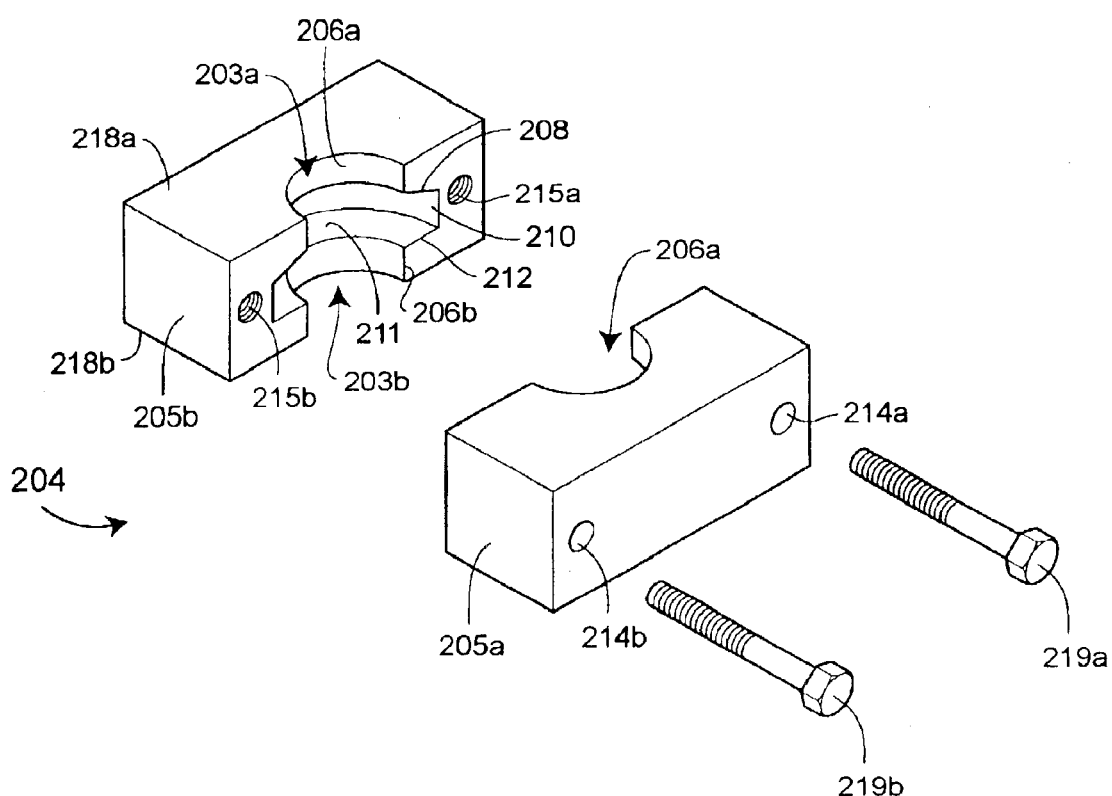
FIG. 3 illustrates a perspective view of the stem union of the present rod connector assembly.

Referring now to FIG. 3, a fundamental component of the improved valve stem connector, a stem union 204, is separately illustrated. The stem union 204 is fashioned by fastening two approximately equal connector halves 205a–b together forming a connector to mechanically bind the actuator rod 230 to the valve stem 260 (shown cross-sectionally in FIG. 4). When joined, the connector halves 205a–b create an internal cavity 211 having two openings 203a–b. The internal cavity 211 has a larger diameter than the openings 203a–b to provide an upper rim 206a and a lower rim 206b within the stem union 204. As described in greater detail below, when the connector halves 205a–b are fastened together, the upper rim 206a and the lower rim 206b will create a wedging effect within the internal cavity 211 that binds the actuator rod 230 to the valve stem 260. The connector halves 205a–b are fastened by inserting two bolts 219a–b through the clearance holes 214a–b in the first connector half 205a into the receiving bolt holes 215a–b in second connector half 205b. The clearance holes 214a–b do not threadably engage the bolts 219a–b as do the receiving bolt holes 215a–b, thus allowing the connector halves 205a–b to be drawn together to produce the wedging effect. Other means for connecting the connector halves 205a–b together are possible as understood by those skilled in the art.

Figure 4:
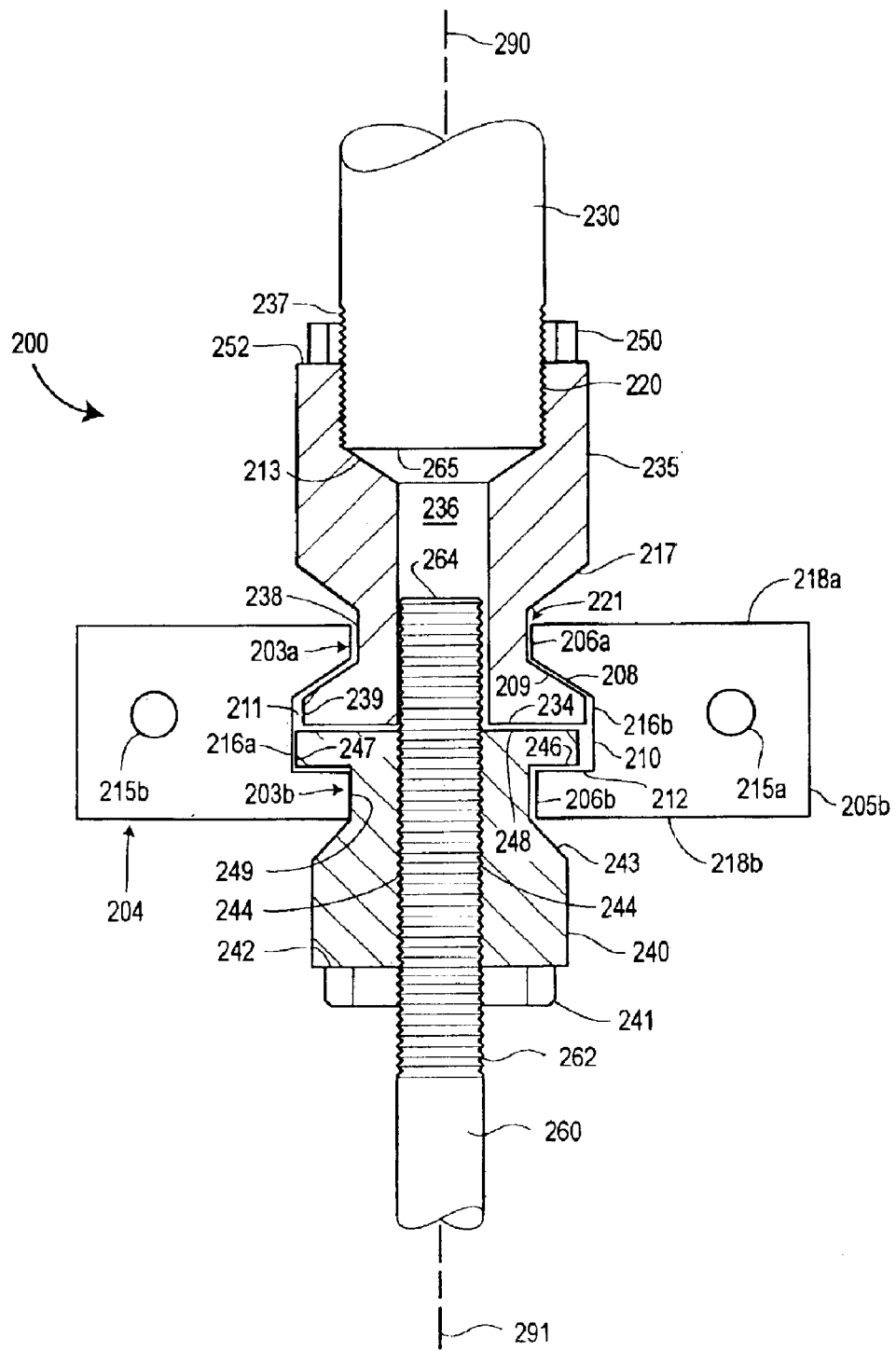
FIG. 4 is a cross-sectional view illustrating the present rod connector assembly mechanically coupling a misaligned actuator rod to a valve stem.

As previously described, conventional control valve assemblies provide threaded sections on the actuator rod and the valve stem for mechanically coupling them together using a conventional connector. The rigid connection provided by the conventional valve stem connector between the thread sections cannot accommodate any axial misalignment between the actuator rod and the valve stem. FIG. 4 depicts a cross-sectional view of the improved valve stem connector assembly 200. The valve stem connector assembly 200 includes the stem union 204, a valve stem adapter 240, a valve stem jam nut 241, an actuator rod adapter 235, and an actuator rod jam nut 250. The valve stem adapter 240 and the actuator rod adapter 235 create corresponding mating surfaces that, when used in conjunction with the stem union 204, can accommodate axial misalignment as described below. The valve stem adapter 240 contains a threaded interior cylindrical surface 244 for mating with a threaded section 262 of the valve stem 260. The valve stem adapter 240 further contains a flange 247 to interlock with the lower rim 206b of the stem union 204 as shown. The actuator rod adapter 235 includes a threaded interior cylindrical surface 220 for mating with a threaded section 237 of the actuator rod 230. The actuator rod adapter 235 further includes a tapered undercut 221, defined by three exterior surfaces 239, 238, and 209, to engage the upper rim 206a of the stem union 204 as shown.

The improved valve stem connector assembly 200 is initially assembled by attaching the actuator rod adapter 235 to the actuator rod 230. First, the actuator rod jam nut 250 is threaded to the extent of the threaded section 237 of the actuator rod 230. The actuator rod adapter 235 is subsequently threaded on the actuator rod 230 until a point on the end surface 265 of the actuator rod 230 forcibly contacts the leading edge of an internal tapered surface 213 in the actuator rod adapter 235. Finally, the actuator rod jam nut 250 is tightened into the actuator rod adapter top surface 252 to lock the actuator rod adapter 235 in position on the actuator rod 230. The next assembly step requires attaching the valve stem adapter 240 to the valve stem 260.

To attach the valve stem adapter 240, the valve stem jam nut 241 is threaded to the extent of the threaded section 262 of the valve stem 260. The valve stem adapter 240 is then screwed onto the threaded section 262 of the valve stem 260. As illustrated in FIG. 4 and as claimed, the present valve stem connector assembly 200 provides improved adjustability to accommodate wide variability in the length of the valve stem 260. The valve stem adapter 240 is adjusted by threading the valve stem adapter 240 to the desired position on the threaded section 262 of the valve stem 260. An internal cavity 236 formed within the actuator rod adapter 235 can receive a portion of the valve stem 260. The diameter of cavity 236 is approximately 0.060 inches larger than the diameter of the valve stem 260 to accommodate a substantial amount of axial misalignment between longitudinal axis 291 of the valve stem 260 and the longitudinal axis 290 of the actuator rod 230. The valve stem 260 can be threaded through the valve stem adapter 240 until the valve stem end 264 makes contact with the actuator rod end 265. Depending on the combination of the actuator and the control valve, the valve stem 260 may protrude through the top surface 248 of the valve stem adapter 240 (as illustrated in FIG. 4). Furthermore, the valve stem length may also be effectively extended if the valve stem 260 is short and does not protrude through the top surface 248 of the valve stem adapter 240. The extension is achieved by leaving a minimum number of threads to safely engage (typically about 6–8) the mating surfaces 244 and 262. These elements make the present stem connector assembly 200 cost advantageous since a single part can accommodate valve stems of variable lengths. The valve stem connector assembly 204 may provide valve stem adjustability of approximately +1.5 inches.

As understood by those skilled in the art, to adjust valve travel using the present valve stem connector assembly 200, first, the control valve assembly travel stops are selected (not illustrated). Subsequently, the valve stem adapter 240 is threaded towards the actuator rod adapter 235 until the top surface 248 of the valve stem adapter 240 contacts the bottom surface 234 of the actuator rod adapter 235. By placing these generally planar surfaces 234 and 248 intimate contact with each other, any lost motion within the assembly is substantially eliminated. Additionally, the end surfaces 234 and 248 can form a frictional contact surface between the actuator rod 230 and the valve stem 260 when stem union 204 is connected and tightened (described below). This frictional contact surface will create a substantial resistance to rotation of the valve stem 260 during operation. The diameters of the leading cylindrical surface 239 and the flange 247 are substantially equal, thus the outer edges of the end surfaces 234 and 248 will align if the actuator rod 230 and the valve stem adapter 240 are axially aligned. However, if the actuator rod 230 and the valve stem adapter 240 are misaligned, as shown in FIG. 4, the stem union 204 can advantageously tolerate the misalignment (described in greater detail below).

Once the valve travel stop is properly adjusted, the valve stem jam nut 241 is tightened into the bottom surface 242 of the valve stem adapter 240, effectively locking the valve stem adapter 240 in position on the valve stem rod 260. As understood by those skilled in the art, either the valve stem adapter 240 or the actuator rod adapter 235 could be attached to the rod using an alternate means such as a set screw and slotted-keyway without departing from the present valve stem connector assembly 200 as claimed. For example, this alternative attachment method could be used to affix the adapters to a rod not having a circular cross-section. Additionally, in the present embodiment, the valve stem 260 has a diameter smaller than the actuator rod 230, but as understood by those skilled in the art, the valve stem 260 diameter could be substantially equal to the actuator rod 230 diameter.

Next, both connector halves 205a–b are positioned to enclose the actuator rod adapter 235 and the valve stem adapter 240 as depicted in FIG. 3 and cross-sectionally in FIG. 4. The openings 203a–b of the stem union 204 have a diameter approximately 0.060 inches larger than the diameter of the engagement surface 238 of actuator rod actuator 230 and the engagement surface 249 of the actuator rod adapter 240, respectively. Additionally, the cavity 211 (delimited by surface 210 and defined between a tapered surface 208 and a horizontal surface 212) has a larger diameter than the diameter of the leading cylindrical surface 239 of actuator rod 230 and the diameter of the flange 247 of valve stem adapter 240. The resulting gaps described above accompany the oversized internal cavity 236 of the actuator rod adapter 235 to accommodate any axial misalignment between actuator rod 230 and valve stem 260. For example, if the actuator rod longitudinal axis 290 was shifted left of the valve stem longitudinal axis 291 by about 0.030 inches, as shown in FIG. 4, the valve stem 260 would contact the left wall on the internal cavity 236. Also, the left edge of the flange 247 would contact the left wall 216a of the cavity 211 of the stem union 204 while the right edge of the actuator adapter 235 would contact the right wall 216b of the stem union cavity 211. One skilled in the art would realize that the actual diameter of the stem union cavity 211 can vary to accommodate various magnitudes of axial misalignment.

Additionally, for the stem union 204 to properly fit around the actuator rod adapter 235 and the valve stem adapter 240, the vertical length of the axial surface 210 of the cavity 211 must be approximately equal to the combined vertical length of the flange 247 of the valve stem adapter 240 and the leading cylindrical surface 239 of the actuator rod adapter 235. Further, the vertical length of the upper rim 206a must be less than the vertical length of engagement surface 238 of actuator rod adapter 235. Similarly, the vertical length of lower rim 206b must be less than the vertical length of the engagement surface 249 of the valve stem adapter 240. As understood by those skilled in the art, the previously described geometric relationships between the cavity 211 and the adapters 235 and 240 ensure proper loading of the valve stem connector components. Proper loading of the valve stem connector components creates the desired wedging effect to provide a tightly coupled actuator rod 230 and valve stem 260.

Continuing, once the connector halves 205a–b are properly fitted around the adapters 235 and 240, the bolts 219a–b are tightened such that connector halves 205a–b are further compressed together, causing actuator rod 230 and actuator rod adapter 235 to move slightly downward in relation to stem union 204 and towards valve stem adapter 240. This occurs as a result of a point of contact being formed on the tapered surface 208 in the cavity 211 as it is being seated into the tapered contact surface 209 of the actuator rod adapter 235.

The tapered surface 208 is at an angle of approximately 47 degrees with respect to the upper thrust surface 218a. The tapered contact surface 209 is at an angle of approximately 45 degrees with respect to the end surface 234 of the actuator rod adapter 235. The interference angle, as defined by the difference of the angle of the two tapered surfaces 208–209, is approximately two degrees. As understood by those skilled in the art, an interference angle greater than zero provides an interference fit between the two tapered surfaces 208–209 when placed under compression by the stem union 204. The interference fit produces the wedging effect within the stem connector assembly 200 that binds and retains the valve stem adapter 240 and the actuator rod adapter 235 under both compressive and tensile loads during valve operation. However, other angles (such as those in the range of 40 to 60 degrees) or other geometry (such as a spherical surface having a radius) could be used to create the same fastening method.

The wedging effect occurs as connector halves 205a–b are further compressed, drawing the actuator rod adapter end surface 234 down into the valve stem adapter 240. The downward movement creates a line of contact between the internal horizontal contact surface 212 of the stem union and the horizontal contact surface 246 of the valve stem adapter 240 forming a second frictional surface. This second frictional surface formed on horizontal contact surface 212 also assists in preventing undesirable rotation of valve stem rod 260. In this embodiment, the horizontal surfaces 212 and 246 are substantially horizontal and form right angles with cylindrical surfaces 210 and the flange 247, respectively. However, one skilled in the art recognizes that other angles (such as those less than 10° degrees) could be used to create the line of contact. The exterior tapered surfaces of both adapters 217 and 243 are arbitrarily angled to create adequate assembly clearance of the upper and lower thrust surfaces 218a–b on the stem union 204. Additionally, the upper and lower thrust surfaces 218a–b conveniently provide a thrust location for manual actuation of the valve in both directions of travel. The present rod connector assembly provides an improved valve stem connector that is tolerant of axial misalignment between the actuator rod and the valve stem, for conventional control valves assemblies.

Figure 5:
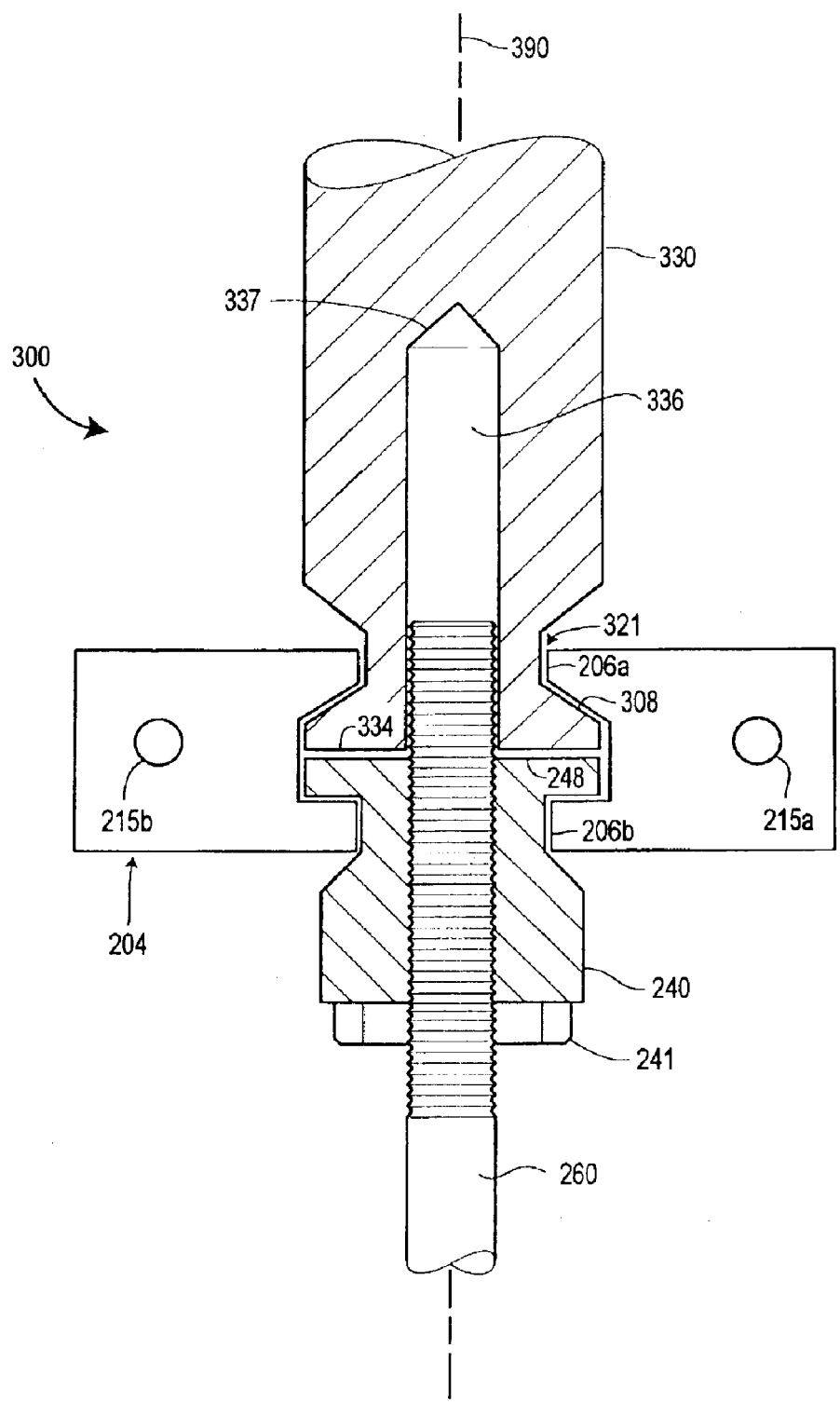
FIG. 5 illustrates a cross-sectional view of an actuator rod modified to include the features of the present rod connector assembly.

Referring now to FIG. 5, another embodiment is depicted. This particular embodiment relies upon the same assembly components and assembly procedures as previously described above except for those pertaining specifically to the actuator rod adapter 235. This embodiment incorporates the geometric features, as described, in the actuator rod adapter 235 directly into the actuator rod 330 resulting in additional component cost savings and further simplifying the assembly process. On the actuator rod 330, an undercut 321 with a tapered surface 308 engages the upper rim 206a of the stem union 204. As previously described, upon the assembly and tightening of the stem union 204, the tapered surface 308, containing a 45 degree taper to establish the desired interference fit, produces a wedging effect that binds the actuator rod end surface 334 against the end surface 248 of the valve stem adapter 240. Additionally, an internal cavity 336 having a diameter approximately 0.060 inches larger than the diameter of the valve stem 260 has been provided within the actuator rod 330 along its longitudinal axis 390. The internal cavity accommodates any protruding length of valve stem 260 once the valve travel has been adjusted. The tapered surface 337 of the internal cavity 336 limits the protrusion length of the valve stem 260 to approximately 1.5 inches. As understood by those skilled in the art, additional cavity lengths can be envisioned without departing from the spirit and scope of the present valve stem connector assembly 300.

Figure 6:
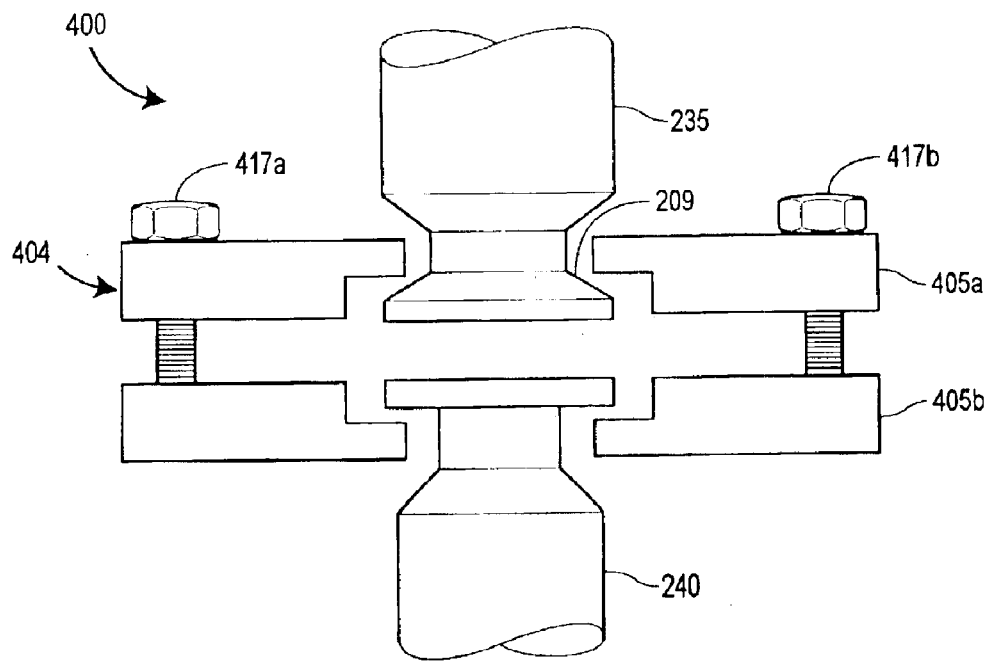
FIG. 6 illustrates a side view of an alternate embodiment of the present rod connector assembly using a vertical clamping arrangement in the rod union.
Figure 7:
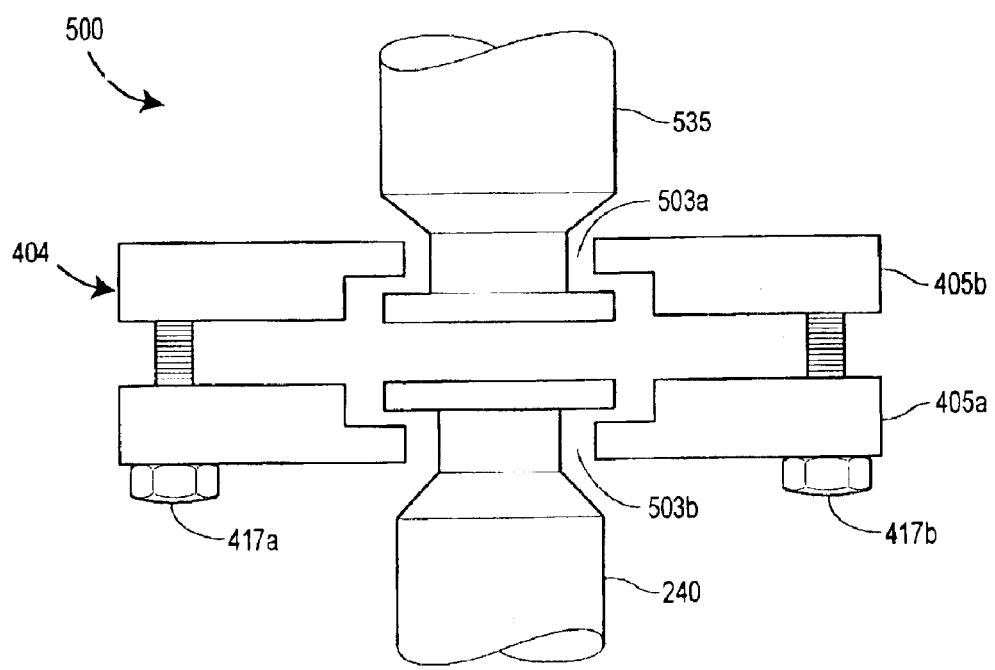
FIG. 7 illustrates a side view of another alternate embodiment of the present rod connector assembly using a vertical clamping arrangement in the rod union.

The foregoing detailed description has been given for clearness of understanding only, and no unnecessary limitations should be understood therefrom, as modifications will be obvious to those skilled in the art. For example, it can be appreciated by those skilled in the art that the geometry and the orientation of the physical elements binding the valve stem assembly and the actuator rod assembly can be reversed without departing from the particular forms disclosed. Furthermore, referring to FIGS. 6 and 7, one skilled in the art can further appreciate additional embodiments of the present rod connector assembly that may accommodate axial misalignment of an actuator rod and a valve stem (not shown). The rod connector assembly 400 depicted in FIG. 6 employs the technical advantages of the actuator rod adapter 235 and the valve stem adapter 240, previously illustrated in FIG. 4, with an alternate rod union 404. As previously described, a line of contact on the tapered surface 209 of the actuator rod adapter 235 provides the compressive force to mechanical bind the actuator rod adapter 235 to the valve stem adapter 240. In this alternate embodiment, the compressive force exerted by the alternate rod union 404 is provided by vertically clamping the rod union halves 405a–b with the attachment bolts 417a–b. Additionally, FIG. 7 depicts another embodiment of a rod connector assembly 500 that accommodates axial misalignment of the actuator rod and the valve stem (not shown). This particular embodiment relies upon substantial clearance through openings 503a–b in the rod union 404 to accommodate axial misalignment of the actuator rod adapter 535 and the valve stem adapter 240. As illustrated, the vertical clamping arrangement can accommodate axial misalignment between two rods without using a tapered mating surface on actuator rod adapter 535 to provide the compressive engagement.

What I claimed is:

1. A rod connector assembly, the rod connector assembly comprising:
    a first rod adapter having an undercut adjacent to a first mating surface;
    a second rod adapter having an undercut adjacent to a second mating surface; and
    a rod union for enclosing and mating the first and second mating surfaces of the first and second rod adapters at the undercuts, the rod union having an internal cavity to form a first rim and a second rim for receiving and retaining the first and second mating surfaces wherein the second rod adapter includes a threaded portion therethrough such that adjustment of the second rod adapter on a second rod permits a predetermined length of the second rod to protrude through the second rod adapter.

2. The rod connector assembly according to claim 1, wherein the internal cavity is large enough to accommodate an axial misalignment between the first rod adapter and the second rod adapter.

3. The rod connector assembly according to claim 1, wherein the undercut of the first rod adapter has an acute angle with respect to the first mating surface to create a wedging effect when the rod union encloses the first and second mating surfaces.

4. The rod connector assembly according to claim 1, wherein the first rod adapter further comprises a second internal cavity formed for receiving at least a portion of the second rod.

5. The rod connector assembly according to claim 4, wherein the first rod adapter is comprised of an actuator rod.

6. The rod connector assembly according to claim 4, wherein the first rod adapter further includes an actuator rod and an actuator rod adapter, the actuator rod adapter having means for attaching to the actuator rod, the actuator rod adapter also having the undercut for creating the first mating surface that is substantially parallel to a longitudinal axis defined by the actuator rod, the actuator rod adapter further having the second internal cavity formed for receiving at least a portion of the second rod.

7. The rod connector assembly according to claim 6, wherein the second rod is a valve stem.

8. The rod connector assembly according to claim 6, wherein the means for attaching the actuator rod adapter to the actuator rod comprises a threaded portion for adjustably threading the actuator rod adapter on a threaded end of the actuator rod and a nut fastened against the actuator rod adapter on the threaded end for securing the actuator rod adapter on the actuator rod.

9. The rod connector assembly according to claim 4, wherein the second internal cavity diameter is greater than the second rod diameter to accommodate an axial misalignment between the first rod adapter and the second rod adapter.

10. The rod connector assembly according to claim 3, wherein the internal cavity of the rod union includes a tapered surface wherein a line of contact is formed between the undercut and the tapered surface at a first angle greater than 40 degrees with respect to an end surface of the first rod adapter.

11. The rod connector assembly according to claim 10, wherein the tapered surface of the rod union is tapered at an angle equal to or greater than the first angle by no more than 5 degrees.

12. The rod connector assembly according to claim 10, wherein the line of contact is formed between the tapered surface of the rod union and the undercut of the first rod adapter.

13. The rod connector assembly according to claim 1, wherein the rod union includes an upper and a lower thrust surface approximately perpendicular to the longitudinal axis of the first rod adapter.

14. A valve stem connector assembly, the valve stem connector assembly comprising:
an actuator rod assembly, the actuator rod assembly having a substantially planar end surface generally perpendicular to a longitudinal axis defined by the actuator rod, the actuator rod assembly also having an undercut adjacent to the end surface to provide a first mating surface positioned at an acute angle with respect to the end surface;
a valve stem assembly, the valve stem assembly being comprised of a valve stem and a valve stem adapter, the valve stem adapter having means for attaching to the valve stem, the valve stem adapter further having a substantially planar end surface generally perpendicular to a longitudinal axis defined by the valve stem, the valve stem adapter also having an undercut adjacent to the end surface to provide a second mating surface;
a stem union for enclosing the first rod assembly and the second rod assembly, the stem union comprising two generally equal halves providing a first internal cavity having a first diameter, the first internal cavity further including two openings having a second diameter wherein the second diameter is less than the first diameter to provide a first rim and a second rim for receiving the first and second mating surfaces; and
attachment means for joining the two halves of the stem union to mechanically couple the actuator assembly to the valve stem assembly wherein the end surface of the actuator assembly and the end surface of the valve stem assembly are placed in substantially planar contact.

15. The valve stem connector assembly according to claim 14, wherein the actuator rod assembly is comprised of an actuator rod and an actuator rod adapter, the actuator rod adapter having means for attaching to the actuator rod, the actuator rod adapter further having the undercut for creating the first mating surface, the actuator rod adapter further including a second internal cavity formed for receiving at least a portion of the valve stem.

16. The valve stem connector assembly according to claim 15, wherein the second internal cavity diameter is greater than the valve stem diameter to accommodate axial misalignment between the actuator rod assembly and the valve stem assembly.

17. The valve stem connector assembly according to claim 14, wherein the actuator rod assembly is comprised of an actuator rod, the actuator rod further including a second internal cavity formed for receiving at least a portion of the valve stem.

18. The valve stem connector assembly according to claim 17, wherein the second internal cavity diameter is greater than the valve stem diameter to accommodate axial misalignment between the actuator rod assembly and the valve stem rod assembly.

19. The valve stem connector assembly according to claim 14, wherein the first diameter is greater than the diameter of the first and second mating surfaces to accommodate axial misalignment between the actuator rod assembly and the valve stem rod assembly.

20. A method for reducing the friction between a valve stem assembly and a valve packing set created by the axial misalignment of an actuator rod assembly and the valve stem assembly, the method comprising the steps of:
fabricating an actuator rod assembly to have a substantially planar end surface generally perpendicular to a longitudinal axis defined by the actuator rod, the actuator rod assembly also having an undercut adjacent to the end surface to provide a first mating surface positioned at an acute angle with respect to the end surface;
attaching a valve stem adapter to a valve stem, the valve stem adapter having a substantially planar end surface generally perpendicular to a longitudinal axis defined by the valve stem, the valve stem adapter also having an undercut adjacent to the end surface to provide a second mating surface;
fashioning a stem union comprised of two generally equal halves containing a first internal cavity to provide corresponding mating surfaces for the first mating surface of the actuator rod assembly and the second mating surface of the valve stem adapter wherein the first internal cavity is arranged to receive the undercut of the actuator rod assembly and the undercut of the valve stem adapter, the cavity having sufficient dimensions to accommodate substantial axial misalignment of the actuator rod assembly and the valve stem; and
fastening the stem union about the actuator assembly and the valve stem adapter wherein the end surface of the actuator assembly and the end surface of the valve stem adapter are placed in substantially planar contact.

21. The method according to claim 20, wherein fabricating the actuator rod assembly includes fashioning an undercut into the actuator rod that is substantially parallel to the longitudinal axis defined by the actuator rod and adjacent to the substantially planar end surface of the actuator rod.

22. The method according to claim 21, wherein fabricating the actuator rod assembly includes providing a second internal cavity for receiving at least a portion of the valve stem, the second internal cavity having a diameter greater than the diameter of the valve stem.

23. The method according to claim 20, wherein arranging the actuator rod assembly includes attaching an actuator rod adapter to an actuator rod, the actuator rod adapter also having the undercut for creating the first mating surface that is substantially parallel to the longitudinal axis defined by the actuator rod, the actuator rod adapter further having the second internal cavity formed for receiving at least a portion of the valve stern.

24. The method according to claim 23, wherein attaching the actuator rod adapter to an actuator rod comprises providing an internal threaded portion within the actuator rod adapter for adjustably threading the actuator rod adapter on a threaded end of the actuator rod and a nut fastened against the actuator rod adapter on the threaded end for securing the actuator rod adapter on the actuator rod.

25. The method according to claim 20, wherein attaching the valve stem adapter to the valve stem comprises providing a threaded portion within the valve stem adapter for adjustably threading the valve stern adapter on a threaded end of the valve stem and a nut fastened against the valve stem adapter on the threaded end for securing the valve stem adapter on the valve stern.

26. A control valve assembly, comprised of:
   a valve, the valve having a valve body including a fluid inlet and a fluid outlet, the fluid inlet and fluid outlet being connected by a fluid passageway;
   a moveable operator contained within the valve body to control the fluid flow through the fluid passageway, the moveable operator including an operator stem assembly protruding from the valve body;
   actuation means directly attached to the valve body to provide motive force to the moveable operator, the actuation means including an actuator rod assembly; and
   a rod connector assembly to axially connect the operator stem assembly to the actuator rod assembly wherein the operator stem assembly includes an adjustable adapter attached the operator stem assembly to accommodate variable operator stem assembly length, the adjustable adapter further having a first mating surface, the actuator rod assembly having a second mating surface including a first internal cavity to accept a portion of the operator stem, and an union with a second internal cavity to correspondingly engage the first and second mating surfaces wherein the first internal cavity of the actuator rod assembly and the second internal cavity of the union provide clearance spacing to accommodate axial misalignment of the operator stem assembly and the actuator rod assembly.

* * * * *

UNITED STATES PATENT AND TRADEMARK OFFICE
CERTIFICATE OF CORRECTION

PATENT NO. : 6,886,805 B2          Page 1 of 1
DATED : May 3, 2005
INVENTOR(S) : Michael W. McCarty It is certified that error appears in the above-identified patent and that said Letters Patent is hereby corrected as shown below:

Column 2,
Lines 39-40, delete "the" before "a minimum".

Column 5,
Lines 50-51, insert -- in -- before "intimate".

Column 8,
Line 21, delete "mechanical" and insert -- mechanically --.

Column 11,
Lines 8, 19 and 22, delete "stern" and insert -- stem --.

Column 12,
Line 14, insert -- to -- after "attached".

Signed and Sealed this

Seventh Day of February, 2006

JON W. DUDAS
*Director of the United States Patent and Trademark Office*